US008650266B2

(12) United States Patent
Cohen (10) Patent No.: US 8,650,266 B2
(45) Date of Patent: Feb. 11, 2014

(54) CACHE VALIDATION USING SMART SOURCE SELECTION IN A DATA NETWORK

(75) Inventor: Edith Cohen, Berkeley Heights, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1574 days.

(21) Appl. No.: 10/063,341

(22) Filed: Apr. 12, 2002

(65) Prior Publication Data

US 2003/0187917 A1   Oct. 2, 2003

Related U.S. Application Data

(60) Provisional application No. 60/367,831, filed on Mar. 26, 2002.

(51) Int. Cl.
*G06F 15/16* (2006.01)
*G06F 15/173* (2006.01)
*G06F 13/28* (2006.01)

(52) U.S. Cl.
USPC ............ 709/219; 709/217; 709/223; 711/122

(58) Field of Classification Search
USPC ......... 709/212, 213, 214, 216, 218, 219, 217, 709/223; 711/122, 133
See application file for complete search history.

(56) References Cited

U.S. PATENT DOCUMENTS

| 5,924,116 | A  * | 7/1999 | Aggarwal et al. ............ 711/122 |
| 5,933,849 | A  * | 8/1999 | Srbljic et al. ................. 711/118 |
| 6,260,061 | B1 * | 7/2001 | Krishnan et al. .............. 709/213 |
| 6,330,605 | B1 * | 12/2001 | Christensen et al. ......... 709/226 |
| 6,341,311 | B1 * | 1/2002 | Smith et al. ................... 709/226 |
| 6,421,674 | B1 * | 7/2002 | Yoakum et al. ................ 707/10 |
| 6,578,066 | B1 * | 6/2003 | Logan et al. .................. 718/105 |
| 6,775,291 | B1 * | 8/2004 | Ryu et al. ...................... 370/401 |
| 6,839,700 | B2 * | 1/2005 | Doyle et al. .................. 707/719 |
| 6,883,068 | B2 * | 4/2005 | Tsirigotis et al. ............. 711/133 |
| 2002/0169890 | A1 * | 11/2002 | Beaumont et al. ............ 709/245 |
| 2003/0110296 | A1 * | 6/2003 | Kirsch et al. .................. 709/246 |
| 2004/0128346 | A1 * | 7/2004 | Melamed et al. ............. 709/203 |
| 2004/0255016 | A1 * | 12/2004 | Hundscheidt et al. ........ 709/223 |

OTHER PUBLICATIONS

E. Cohen, E. Halperin, and H. Kaplan, "Performance aspects of distributed caches using TTL-based consistency", 2001, In Proceedings of the ICALP'01 conference.*
Edith Cohen and Haim Kaplan, "Aging through cascaded caches: performance issues in the distribution of Web content", 2001, In Proceedings of the ACM SIGCOMM'01 Conference.*
E. Cohen and H. Kaplan. , "The age penalty and its effect on cache performance", Jan. 16, 2001, Web Page, Available at: http://www.research.att.com/~edith/Papers/HTML/usits01/index.html.*
Edith Cohen and Haim Kaplan, "The Age Penalty and its Effect on Cache Performance" 2001, Web Page, archived at: http://web.archive.org/web/20010428142726/http://www.math.tau.ac.il/~haimk/ papers/age_html/.*
Edith Cohen and Haim Kaplan, "The Age Penalty and its Effect on Cache Performance", Mar. 26, 2001, In Proceedings of the 3rd USENIX Symposium on Internet Technologies and Systems, pp. 73-84.*

* cited by examiner

*Primary Examiner* — Aaron Strange (57) ABSTRACT

In accordance with aspects of the invention, "low-level" caches can utilize source selection while non-authoritative sources can take advantage of rejuvenation to alleviate what the inventor refers to as "age penalty" and thereby reduce validation traffic.

12 Claims, 7 Drawing Sheets

CACHE VALIDATION USING SMART SOURCE SELECTION IN A DATA NETWORK

CROSS RELATIONS TO RELATED APPLICATIONS

This application claims priority to United States Provisional Application "IMPROVED CACHE VALIDATION IN A PACKET-SWITCHED NETWORK," Ser. No. 60/367,831, filed on Mar. 26, 2002, the contents of which are incorporated by reference herein.

BACKGROUND OF THE INVENTION

The present invention relates to validation of content cached in a packet-switched data network.

Data networks, such as packet-switched networks based on the TCP/IP protocol suite, can be utilized to distribute a rich array of digital content to a variety of different client applications. Some of the most popular applications on the Internet today are browsing applications for searching the World Wide Web, e.g. Mozilla, Netscape Navigator, Opera, or Microsoft Internet Explorer, which utilize the HyperText Transfer Protocol (HTTP) to retrieve data objects such as documents written in the HyperText Markup Language (HTML) along with embedded content. See, e.g., R. Fielding et al., "Hypertext Transfer Protocol—HTTP/1.1," Internet Engineering Task Force (IETF), Request for Comments (RFC) 2616, 2068, Network Working Group, 1999; T. Berners-Lee et al., "Hypertext Transfer Protocol—HTTP/1.0," IETF, RFC 1945, Network Working Group, 1996; which are incorporated by reference herein.

It is often advantageous to cache content at an intermediary between a client and remote server, to reduce user-perceived latency, server load, and to avoid burdening the network with multiple requests for the same content. The difficulty with caching resources at a proxy cache or within a browser cache is an issue referred to in the art as "cache coherency"—namely, ensuring that the proxy knows that the cached resource is still current. Both HTTP/1.0 and the newer HTTP/1.1 provide mechanisms for validating cached objects with an authoritative server or an origin server. For example, a client/proxy can issue what is referred to as a conditional ("If-Modified-Since" (IMS) or "E-tag" based) GET request, to which the server responds with a "304" response if the object has not been modified since the specified date ("304" being the HTTP response code for "Not Modified"). A full copy of the resource is not provided to the client/proxy unless the cached copy is no longer current. Most current caching platforms validate their content passively, i.e. when a client request arrives and the cached copy of the object is "stale" in accordance with some freshness metric. It can be shown experimentally, however, that a considerable fraction of validation traffic on the Internet today involves stale cached copies that turned out to be current. These validations of currently cached objects have small message size, but, nonetheless, often induce latency comparable to full-fledged cache misses.

Accordingly, it would be desirable to improve the latency incurred by cache clients by minimizing unnecessary validation traffic.

SUMMARY OF THE INVENTION

The present invention is directed to mechanisms for addressing what the inventor refers to as the "age penalty", wherein copies of content requested from a non-authoritative source, such as a high-level cache or a reverse proxy, have a shorter freshness metric than copies of content requested from an authoritative source.

In accordance with an aspect of the invention, validation traffic between a cache and a plurality of sources can be decreased by selecting a source server at least in part based on expected remaining freshness of a copy of the content retrieved from the source server. By validating with a source that has a higher expected remaining freshness, the cache can minimize the number of cache misses and thereby decrease the amount of validation traffic necessary to keep the content fresh in the cache. It is preferable that when selecting a source, the cache balances expected remaining freshness with an estimate of fetching time to the source server and the likelihood of a cache miss at the source server.

In accordance with another aspect of the invention, it is advantageous for sources, such as a high level cache or a reverse proxy, to validate content with an authoritative server before the content's freshness metric reaches some pre-determined threshold. In one embodiment, a set of certain popular content is identified to be "refreshed" or "rejuvenated" whenever the freshness metric, e.g. a TTL, drops below some fraction of its total value. In another embodiment, cached content is simultaneously served and rejuvenated whenever a client request arrives and the freshness metric has dropped below the threshold value. The invention advantageously allows non-authoritative sources to validate data objects before they expire and, thereby, reduce the age of copies stored at the source. Rejuvenation can increase traffic between the a high-level cache and its authoritative server but can also decrease traffic between the high-level cache and its clients.

Accordingly, "low-level" caches can utilize source selection while "high-level" caches can take advantage of rejuvenation to alleviate the age penalty and thereby reduce validation traffic. These and other advantages of the invention will be apparent to those of ordinary skill in the art by reference to the following detailed description and the accompanying drawings.

DETAILED DESCRIPTION

Figure 1:
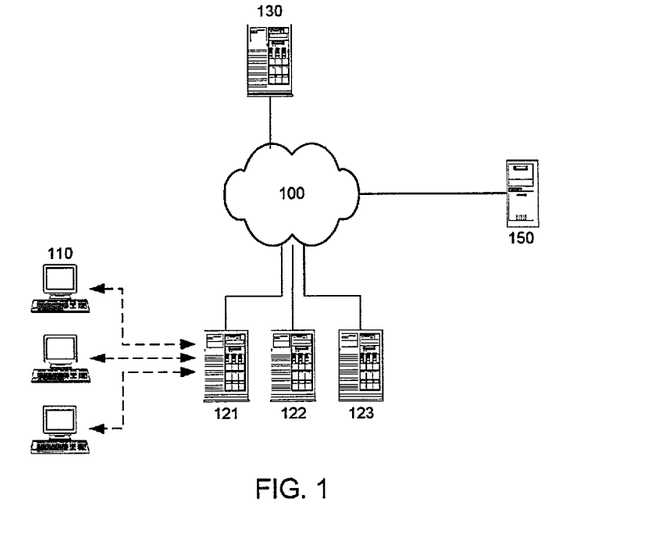
FIG. 1 is an abstract diagram of a caching architecture in a data network, used to illustrate an embodiment of the present invention.

FIG. 1 sets forth an abstract diagram of a caching architecture in a data network, used to illustrate an embodiment of the present invention. A caching server 121 connects one or more clients 110 to a data network 100, e.g. a packet-switched network such as the Internet. The data network 100 provides access to a plurality of content servers, such as server 150. For example, and without limitation, content server 150 can be a Web server that responds to HTTP requests by serving Web pages and other content to clients running Web browser applications. HTTP requests from clients 110 are directed to caching server 121 instead of Web server 150 utilizing known methods of proxy cache deployment. For example, and without limitation, the clients 110 can utilize an access network to send HTTP requests which are transparently intercepted by the caching server 121. Alternatively, the clients 110 can be connected to data network 100 and be explicitly configured to utilize the caching server 121 for HTTP requests. It should be noted that although the present invention is described with particular reference to HTTP, it is not so limited and may be readily extended to other protocols by one of ordinary skill in the art.

Caching server 121 also has access through the data network 100 to a plurality of other sources of replicated content, e.g., caching server 130. HTTP requests from the caching server 121 can be routed to caching server 130, rather than to the origin server 150. For example, and without limitation, the caches can be configured to operate cooperatively in a hierarchy, with the cache 130 acting as a "higher-level" cache to "low-level" caches 121, 122, 123. Alternatively, server 130 can be configured to act as a "reverse proxy" for the Web server 150, while the caching servers 121, 122, 123 act as "local" proxies for clients, e.g. clients 110 in FIG. 1. See, e.g., the Squid Web Proxy Cache (The Squid Web Proxy Cache is a cache software licensed under the GNU General Public License.). The caching servers 121, 122, 123, 130 can be conventional server computers—typically comprising a storage device, a network interface, all connected to one or more central processing units operating under the control of software program instructions stored in a memory unit. The storage device is typically a fast hard disk, which is utilized by the central processing unit to cache data objects.

The age of a data object in the cache is conventionally measured as the difference between the current time, according to the cache's own clock, and the timestamp specified by the object's HTTP DATE: response header, which indicates when the response was generated at the origin. As noted in the background, a cached data object becomes "stale" when its age exceeds some freshness metric. A cached object can contain directives and values in its HTTP response header that can be utilized to compute a "freshness lifetime". For example, an explicit TTL (Time-To-Live) can be assigned by a CACHE-CONTROL: MAX-AGE response header in HTTP/1.1, where the TTL represents the difference between the freshness lifetime and the age of the data object. Alternatively, an explicit lifetime timestamp beyond which the object stops being fresh can be set by an EXPIRES: response header in HTTP/1.0. Where the content author has not specified an explicit freshness lifetime, the cache must resort to some heuristic, e.g. usually based on some adaptive factor that changes depending on how long the object has remained unmodified.

It is well recognized that caches and cache hierarchies reduce server load and typically reduce network usage—in particular where the parent cache 130 is located nearby and en route to the origin server 150. It is also recognized, however, that directing requests to a cache 130 does not always translate to reduced user-perceived latency. If the request constitutes a miss at the parent cache, then typically perceived-latency will be longer than through a direct contact with the server. If the miss is incurred on an unpopular object (where the typical inter-request time exceeds the time a cache would keep the object), there is not even a side-effect value for future requests for the object received by the parent cache 130. The situation is similar when the requested object is cached but stale in both caches and the parent cache 130 issues a validation request to the origin server (there is no side-effect value either if typical inter-request time exceeds freshness time). When the object is not present in the lower cache 121 and is stale at the high-level cache 130, the gain depends on the object size and available bandwidth. Often, however, for small-size objects or when bandwidth is not a bottleneck, a direct contact to the server would have resulted in a faster response. These situations could be exacerbated by deep caching hierarchies.

With reference to FIG. 1, consider the remaining TTL of an object fetched from (a) a nonauthoritative source, such as cache 130, versus (b) an authoritative source, such. as an origin server 150. When an object is fetched from cache 130, it has positive age. The impact of age on the remaining TTL depends on the freshness control directives. For objects with a static EXPIRES: header, the choice of source does not affect TTL. With a "fixed" TTL, however, the copy fetched from a nonauthoritative source has its freshness time lowered by the object's age (unless the cached copy of the object is already stale). Moreover, consider popular objects that are typically cached by both the high-level cache 130 and the low-level caches 121, 122, 123, and are likely to be fresh at the parent cache 130. When an HTTP request forwarded to the parent cache 130 constitutes a content and freshness hit, it is typically a "win" in terms of latency. The choice, however, of using the high-level cache 130 over the origin server 150 as the source may have an adverse effect on the latency incurred on subsequent requests served by the lower cache 121, since the expected remaining freshness time of the object is smaller. At a top-level cache 130, the expected remaining freshness time of fresh cached content is about half of the respective values if directly fetched from the origin server 150. Generally, the expected remaining freshness time of fresh content is reduced with deeper levels of a caching hierarchy. Therefore, a cache that directs requests to another cache instead of origin servers would incur lower freshness rates. The inventor refers to this increase in the miss rate of a client cache using a replicating rather than authoritative source as the "age penalty."

Figure 2:
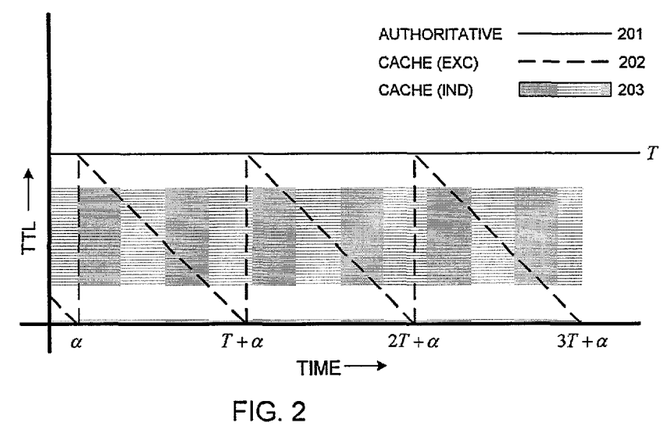
FIG. 2 is a plot of remaining freshness time for a data object requested from different source servers, illustrating the age penalty effect.

This gap between an authoritative server 150 and nonauthoritative caching server 130 is illustrated by FIG. 2. FIG. 2 plots the remaining freshness time for an object with a MAX-AGE or "relative" EXPIRES freshness control (i.e., MAX-AGE=T or EXPIRES=DATE+T) when the object resides at different types of sources. It is useful to abstract the different types of entities to which a client-cache sends requests into three categories:

1. AUTH: an authoritative source that always provides a copy with zero age (i.e. TTL that equals the freshness lifetime).
2. EXC: a scenario where the client-cache upon each miss fetches a copy from the same high-level cache, where the high-level cache maintains a fresh copy refreshing it through an AUTH source each time it expires. At time t, an EXC source provides a copy whose age is $(t-\alpha) \bmod T$ (where TTL equals to $T-(t-\alpha) \bmod T$). Let $\alpha$ be the "displacement" drawn uniformly from the interval $[0, T]$; "mod" is a generalized modulu operation to arbitrary nonnegative numbers $a \bmod b = a - b*\lfloor a/b \rfloor$ where a mod b≡0 if b=0. As shown in FIG. 2, the EXC source provides an age that cycles from 0 to T (and thus a TTL that cycles from T to 0).

3. IND: a scenario where upon each miss, the client-cache forwards the request to a different independent EXC-type high-level cache. Independence means that the displacements of the different high-level caches are not correlated. Upon each miss at the client-cache, the IND source provides a copy with age independently drawn from U[0,T] (thus, a TTL drawn from U[0,T].

Thus, with reference to FIG. 2, line 201 represents the TTL of an object fetched from an AUTH source. Line 202 represents the TTL of an object fetched from an EXC source. Area 203 represents the TTL of an object fetched from an IND source. A similar plot to FIG. 2 can be made where a heuristic expiration for objects is applied, in particular where the objects have not been modified very recently (where the objects have been recently-modified, then the plot is more complicated; nevertheless, the difference in TTL values of two copies is in fact greater than the difference in their ages).

Suppose an object, www.s.com/obj1, is requested at caching server 121 (local-cache) with inter-request times of T/2. The origin server 150 (www.s.com) serves the object with a TTL value of T, as illustrated by FIG. 2. The object is also requested very frequently—and is essentially almost always fresh—at a top-level cache 130 (top-cache). Consider HTTP requests that result in content hits, and essentially freshness misses or hits, at local-cache but constitute both content and freshness hits at top-cache. If validation requests were directed to the origin server, www.s.com, local-cache would incur a freshness hit-rate of ⅔ (every third request would be a freshness miss). If validation requests were directed to the parent cache top-cache, then the freshness rate is ½. The expected freshness rate would be even lower if local-cache alternates between several independent top-level caches. Accordingly, if one were using a performance metric comprising the sum of induced latencies, then it is worthwhile directing requests to top-cache only if the estimated response time is less than ⅔ of that of www.s.com. On the other extreme, when the frequency of requests for www.s.com/obj1 made to local-cache is below 1/T—and is well above 1/T at top-cache—then it is always worthwhile to direct requests to top-cache, since almost all content-hit requests would constitute freshness misses at local-cache regardless of the source. As illustrated by this simple example, the true magnitude of the "age penalty" effect depends on the interaction of TTL length, inter-request times, and modification times.

Smart Source Selection

The latency incurred by cache clients may be improved by a smart selection of source at a "lower-level" cache. In accordance with an embodiment of this aspect of the present invention, FIG. 3 sets forth a flowchart of processing performed by a cache with access to a plurality of content sources. At step 301, a request for a data object is received from the cache's client, e.g. an HTTP GET request for a particular resource identified by a URL. At step 302, a check is made to see whether a copy of the data object is in the cache. If a copy of the data object is in the cache, the freshness control mechanisms described above are utilized to determine whether the cached copy is still fresh or is now stale. If the request results in a fresh cached object, the inventor refers to this as a "freshness hit" and a "content hit". Then, at step 308, the cache can respond to the client request with the cached copy of the resource. If the cached copy is considered stale in accordance with the freshness control mechanisms, then this is referred to by the inventor as a "freshness miss". The cache needs to consult an authority with a fresh copy in order to certify that the content has not been modified. At step 304, the cache makes a selection of one out of the plurality of source servers. The selection is preferably based, at least in part, on a prediction of which server will provide better performance for the present request—as well as future requests for the same data object. In particular, for example, where client latency is a central performance objective, the cache should balance the likelihood of a miss at the selected server cache against the relative "distance", in terms of latency, of the selected server cache and an authoritative server, taking into account the above-mentioned age penalty. The cache can perform an estimate of the fetching time, the expected remaining freshness of a copy from the selected source, and the likelihood of the miss at the selected source. Once the cache decides on a source, the cache at step 305 sends a validation request to the selected server, e.g. a conditional HTTP request for the desired resource. The cache receives the response back from the selected source at step 306. Where the source certifies that the stale cached content has not been modified, the cache treats this as what the inventor refers to as a "content hit" (but not a freshness hit). At step 307, the header of the cached object is updated to reflect the validation results. Then, the cache responds to the client request with the cached copy at step 308. Where it is determined by the selected source that the cached object has been modified, the source sends the cache a fresh copy of the newer content in response to the conditional request. At step 310, the cache receives the data object from the server and caches it. Then, at step 311, the cache responds to the client request with the fresh copy retrieved from the selected source.

Figure 3:
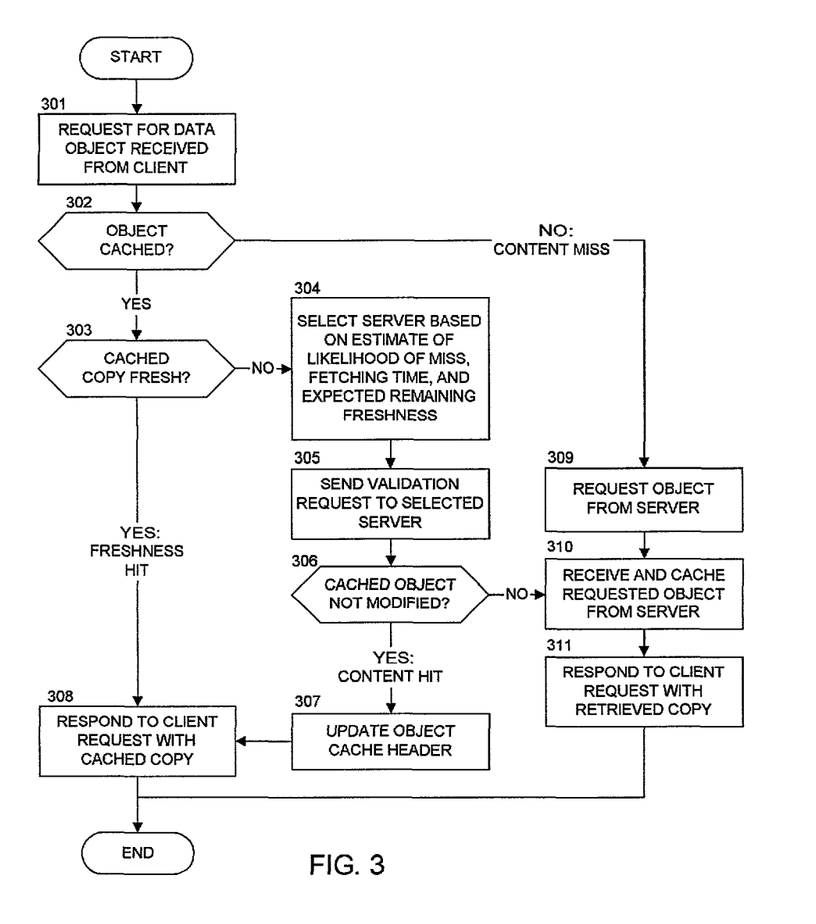
FIG. 3 is a flowchart of processing performed by a cache with access to a plurality of content sources, in accordance with an embodiment of an aspect of the invention.

If the cache does not contain a copy of the requested data object at step 302, then this is treated as a "content miss" and a fresh copy is requested from an advantageous server at step 309. The cache can simply direct the HTTP GET request to higher-level cache server rather than burdening an authoritative server—although the cache can also attempt to optimize the selection of the source as described above in accordance with an advantageous metric. At step 310, the cache receives and caches the response. Then, at step 311, the cache responds to the client request with the data object retrieved from the server.

It can be shown using a simplified model based on the three types of sources described above, that on any request sequence from a client cache, the miss rate of a client-cache that directs its requests to an AUTH source is no greater than the miss rate of a client-cache through an EXC or IND source. In other words, in terms of the age penalty, authoritative servers are the most effective source. Furthermore, it can also be shown that that for any request sequence, the miss rate of a client-cache through an EXC source is no greater than the miss rate of the client-cache through an IND source. Note that with respect to one fixed displacement value α, the EXC source can perform worse than IND. Nevertheless, on average over all displacements, EXC will perform at least as well as IND. This has interesting implications for how to configure a set of top-level content caches to serve a population of clients. It is advantageous to configure a client to send all requests, or at least all requests for a particular object, to the same primary cache. The source selection is, accordingly, configured to treat the source as an EXC rather than as a hybrid with IND. The miss-rate at the high-level caches, however, is likely to be smaller and more stable if the workload is partitioned by object. This partition maximizes the number of clients that can benefit from the object being cached. Accordingly, it is advantageous if the client, when it has a choice, to choose a high-level cache according to the requested object.

Rejuvenation

The age penalty described above can also be alleviated by attempting to make the source always serve reasonably fresh data. This suggests another approach to addressing the age penalty: namely, having the non-authoritative sources validate data objects before they expire, in particular when the freshness lifetime drops below some threshold. The inventor calls this a "pre-term refresh" (note that a pre-term refresh can occur when a client request arriving at a cache contains a no-cache request header). With reference to FIG. 1, a pre-term refresh occurs when a source/higher-level cache 130 sends a request to an authoritative origin server 150 to validate a non-expired copy of a data object. As a result, the cache 130 obtains a copy with zero age. The periodic use of pre-term refreshes (referred to by the inventor as "rejuvenation") by a high-level cache (referred to by the inventor as a "rejuvenating cache") can be used as a proactive mechanism for reducing the age penalty. By reducing the age of cached copies at cache 130, this improves the miss-rate at its client caches 121, 122, 123 in FIG. 1 and consequently the number of requests it receives. Rejuvenation, in other words, increases traffic between cache 130 and authoritative server 150 but can decrease traffic between the cache 130 and its clients 121, 122, 123. Note that the benefit can be large since a single cache can serve numerous clients.

Figure 4:
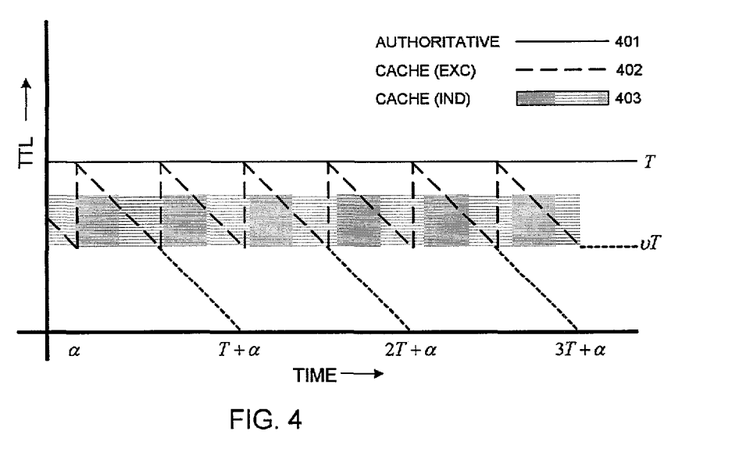
FIG. 4 is a plot of remaining freshness time for a data object requested from different source servers, illustrating rejuvenation.

FIG. 4 illustrates the process of rejuvenation and its effect on TTL as a function of time for a rejuvenating source. As alluded to above, it is useful to abstract the different types of entities to which a client-cache sends requests into three categories. Line 401 in FIG. 4 represents the TTL of an object fetched from an AUTH server. Line 402 in FIG. 4 represents the TTL of an object fetched from a rejuvenating $EXC_\upsilon$ source, which is an EXC source that refreshes its copy of the object when the age exceeds $\upsilon$ fraction of the lifetime value. Formally, let $\alpha$ be drawn from $U[0, \upsilon T]$. At time t, an $EXC_\upsilon$ source returns the object with age $(t-\alpha) \mod (\upsilon*T)$ (so that the TTL is $T-(t-\alpha) \mod (\upsilon*T)$). As with an EXC source, $\alpha$ is fixed for a "run" and performance is the expected performance over runs with different displacements. A client cache is said to use an $IND_\upsilon$ source if upon each miss it forwards the request to a different independent $EXC_\upsilon$ source. Hence, $IND_\upsilon$ sources return copies with age drawn from $U[0, \upsilon T]$ and thus TTL drawn from $U[(1-\upsilon)T, T]$. The TTL as a function of time for the different sources is illustrated in FIG. 4. For both $IND_\upsilon$ and $EXC_\upsilon$ sources, a rejuvenation interval of $\upsilon=1$ corresponds to the respective pure source. A rejuvenation interval of $\upsilon=0$ corresponds to a pure AUTH source.

Figure 5:
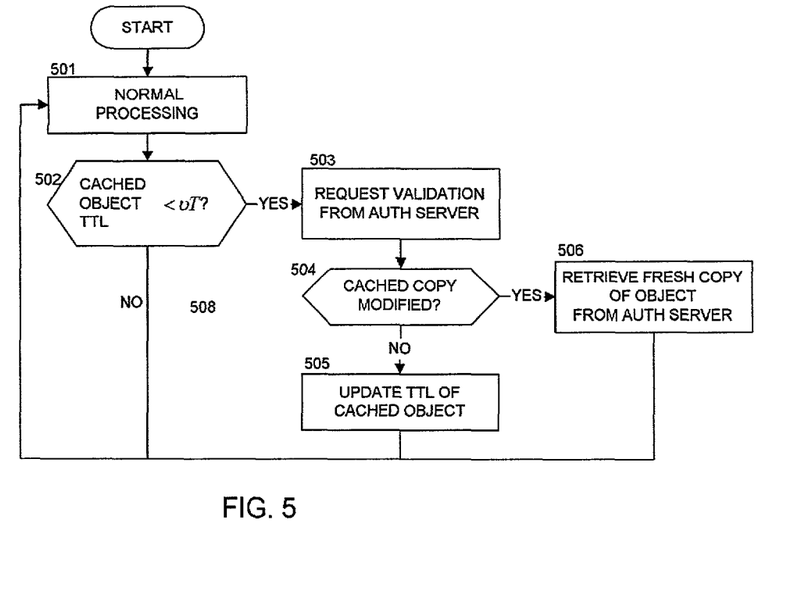
FIG. 5 is a flowchart of processing performed by a content source with access to an authoritative server and a plurality of client caches, in accordance with an embodiment of another aspect of the invention.

FIG. 5 sets forth a flowchart of processing performed by a replicating content source, e.g. "high-level" caching server 130 in FIG. 1, in accordance with an embodiment of this aspect of the invention. At step 501, the server 130 performs normal processing, e.g. handling requests and caching data objects received from authoritative servers such as server 150 in FIG. 1. At step 502, in accordance with some scheduled process, the server 130 checks to see whether certain cached objects have a freshness metric that has become less than some pre-determined value, e.g. whether the remaining TTL has become less than some fraction $\upsilon$ of its original value T. It is preferable that such processing be limited to a set of popular resources. The server can identify such popular resources, for example and without limitation, by the number of requests for a version of the resource per TTL interval. If the TTL for the cached object becomes less than $\upsilon$ T, then, at step 503, the server 130 proceeds to attempt to revalidate the object with its origin server 150. If it is determined that the resource has not been modified at step 504, then, at step 505, the server 130 merely updates the TTL of the cached object. The cached object has been "rejuvenated." If the resource has been modified, then a fresh copy (notably with a full TTL value) is provided by the authoritative server 150 at step 506.

Figure 6:
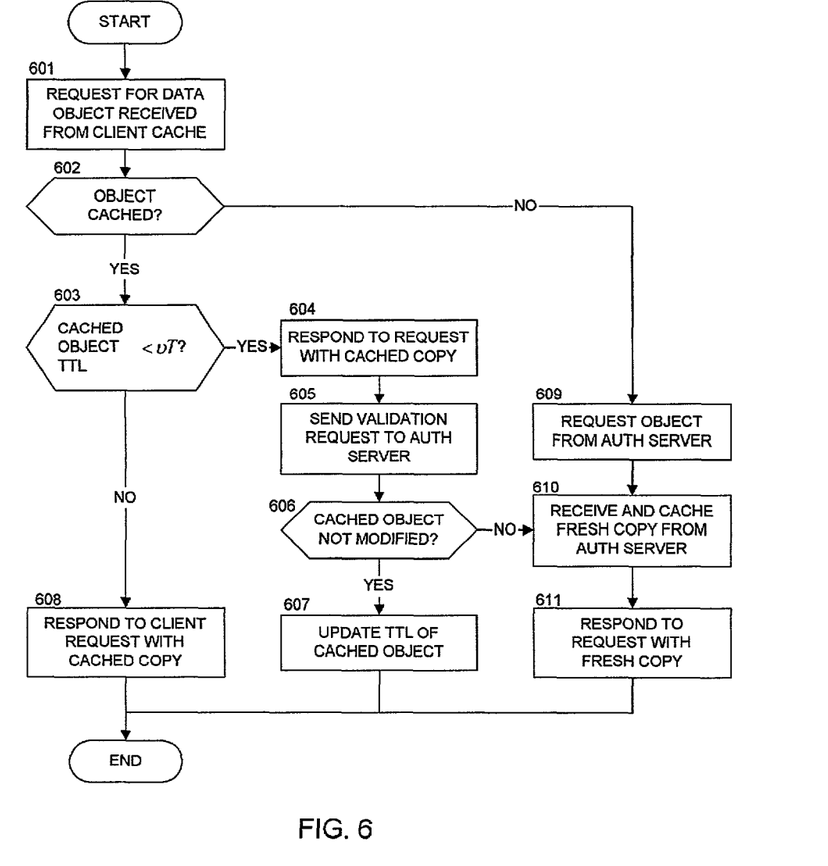
FIG. 6 is a flowchart of processing performed by a content source with access to an authoritative server and a plurality of client caches, in accordance with another embodiment of this aspect of the invention.

An alternative embodiment is illustrated by the flow chart set forth in FIG. 6. At step 601, the server 130 receives a request for a data object from a "lower-level" cache. At step 602, a check is made to see whether a copy of the data object is in the higher-level server's content cache. If a copy of the data object is not in the cache, then the server 130 retrieves and caches a fresh copy of the resource at steps 609 to 611 in order to respond to the request. If a copy of the data object is in the cache, then, at step 603, the freshness metric of the data object is checked to see whether it has become less than some pre-determined value, e.g. whether the remaining TTL has become less than some fraction $\upsilon$ of its original value T. Where the freshness metric has not dropped below the pre-specified value, then the server 130 can respond to the request with the cached copy at step 608. On the other hand, where the freshness metric has dropped below the pre-specified value, then, at step 604, the server 130 serves the request with the cached copy while, concurrently, at step 605, the server 130 attempts to revalidate the copy with an authoritative server 150. If it is determined that the resource has not been modified at step 606, then, at step 607, the server 130 merely updates the TTL of the cached object. The cached object has been "rejuvenated." If on the other hand the resource has been modified, the server 130 takes a fresh copy from the authoritative server 150 at step 610 and replaces the cached copy which is no longer valid. The server 130 can also, at step 611, attempt to communicate back to the client and indicate that the content already provided is no longer valid and provide the client with the new fresh copy. The inventor refers to the embodiment in FIG. 6 as an example of "request-driven" rejuvenation. Notably, this second approach to rejuvenation does not require as much "book-keeping" as the embodiment shown in FIG. 5.

It may appear that since rejuvenation reduces the average age of cached items, it can only improve performance of client-caches. One might expect a monotomic improvement in miss rate at the client cache as $\upsilon$ decreases from $\upsilon=1$ to $\upsilon=0$. This behavior indeed occurs for a rejuvenating $IND_\upsilon$ source. In contrast, however, $EXC_\upsilon$ sources exhibit more involved patterns where for some values of $\upsilon<1$ for high request rates (e.g. for $\upsilon>0.5$ for sequences where the object is requested at least once every $(2\upsilon-1)T$ time units), the miss-rate for $EXC_\upsilon$ can be strictly worse than through basic EXC.

Nevertheless, although generally rejuvenation does not always improve the performance, rejuvenation cannot degrade performance on any sequence if the source preserves what the inventor refers to as "synchronization". The inventor refers to a client cache as being "synchronized" with a source if whenever the client cache contains a copy of the object which expires at some time t, then requests directed to the source at time $t+\Delta(\Delta>0)$ obtain an object whose age is not more than $\Delta$. By definition, a client cache is always synchronized with AUTH and EXC sources but not with an IND source. Intuitively, synchronization means that the copy of the source expires at the same time as the copy at the client cache, and thus, misses at the client cache on requests which closely follow previous requests are more likely to yield a copy with small age. Suppose an $EXC_\upsilon$ source preserves synchronization, i.e. a rejuvenating EXC source adheres to the original refresh schedule, refreshing the object at times $\alpha+iT$ for integral i in addition to possibly rejuvenating it at other points in time. Then, it can be shown on any sequence of requests, the number of misses is not higher than the number of misses through an EXC source without rejuvenation. It follows that the performance through $EXC_\upsilon$ with integral $1/\upsilon$ (i.e., $\upsilon=\frac{1}{2}, \frac{1}{3}, \ldots$) is at least as good as through EXC. A source can lose synchronization by sporadic pre-term refreshes, e.g. caused by HTTP requests with a no-cache request header. A source that wishes to serve sporadic no-cache requests without losing synchronization with its other clients can do one of the following: (a) it can serve the request by contacting an origin server but refrain from updating the expiration time on the cached copy; or (b) it can update the expiration time of its copy but perform another follow-up pre-term refresh of the object at its original expiration time.

Figure 7:
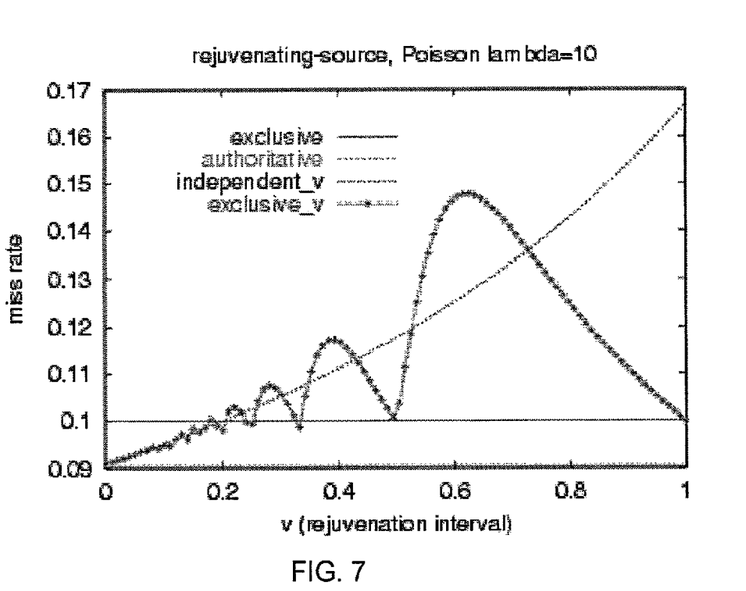
FIG. 7 is a graph of miss rate versus rejuvenation interval for different types of sources.

It can be shown that, for request sequences that follow Poisson and Pareto distributions and for certain trace-based simulations, the miss rate of $EXC_\upsilon$ has local minima for $\upsilon$'s such that $1/\upsilon$ is integral. For and near these values of $\upsilon$, $EXC_\upsilon$ outperforms $IND_\upsilon$. $EXC_\upsilon$ restricted to these points is a convex monotone increasing function of $\upsilon$. Between each pair of local minima, $EXC_\upsilon$ is a concave function of $\upsilon$ and has a local maxima which performs worse than $IND_\upsilon$. This is more pronounced for high request rates (rates>>1 per T interval). FIG. 7 shows an example of this pattern, for Poisson requests with a rate $\lambda=10$. The miss rate is shown graphed against the rejuvenation interval $\upsilon$. It can be shown that the miss rate through an $IND_\upsilon$ source is $2/(2+\lambda(2-\upsilon))$ while the miss rate through an $EXC_\upsilon$ source is $1/(\lambda\upsilon(\lfloor 1/\upsilon \rfloor + \exp(\lambda\upsilon(1/\upsilon - \lfloor 1/\upsilon \rfloor))/(\exp(-\upsilon\lambda)-1)))$. Note that the above general pattern is not universally true for all sequences. Consider requests that arrive at a fixed frequency. The miss rate then through an $EXC_\upsilon$ source will not be monotonic as a function of $\upsilon$, even if we consider only integral values of $1/\upsilon$.

As noted above, rejuvenation policies and follow-up refreshes increase traffic in the upstream channel between the high-level cache 130 and origin servers 150 while potentially reducing user-perceived latency and traffic in the downstream channel between the high-level cache 130 and its clients 121, 122, 123. This tradeoff should guide the selection of rejuvenation interval or the follow-up action on a sporadic pre-term refresh. Consider the simplified metric where the cost is the number of unsolicited refresh requests issued by the high-level cache and the benefit is the reduction in the number of misses incurred at client caches. Whereas the cost is independent of client activity and rather straightforward to estimate (for rejuvenation it is proportional to $1/\upsilon$), estimating the benefit, which is aggregated across all client caches, is a more involved task. The objective then is preferably to maximize the benefit (minimizing the total number of misses at client caches), given some bound on the cost. The benefit may be estimated, on-line or off-line, for example by maintaining a small amount of information on per-client history by tracking a sample of the clients. As suggested above, a general guideline should be followed to keep the rejuvenation frequency at an integral $1/\upsilon$. Again, as suggested above, the average benefit of mixing two rejuvenation intervals such that $1/\upsilon_1$ and $1/\upsilon_2$ are consecutive integral values generally dominate (have equal or higher benefit than) all other choices of $\upsilon$ with the same or lesser cost. The benefits of this guideline will depend on the gap between non-integral values and the lower-envelope constituting of integral values, which increases with request rate.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. For example, the detailed description describes an embodiment of the invention with particular reference to HTTP and the freshness control mechanisms utilized in HTTP. However, the principles of the present invention could be readily extended to other protocols. Such an extension could be readily implemented by one of ordinary skill in the art given the above disclosure.

The invention claimed is:

1. A method of processing a request for content in a cache server comprising:
   receiving, by the cache server, the request for the content from a client;
   determining, by the cache server, if a stale copy of the content is in the cache server;
   estimating, by the cache server, a freshness metric and an estimate of a fetching time for each one of a group of servers;
   selecting, by the cache server, a source server from the group of servers, based on a comparison of an expected remaining freshness of a copy of the content stored at each one of the group of servers computed based on the estimating, when the stale copy of the content is in the cache server, wherein the group of servers comprises a high level cache server and an origin server, wherein the high level cache server comprises a reverse proxy for the origin server, wherein the high level cache server performs a pre-term refresh from the origin server in accordance with a scheduled process to check for content that has a respective freshness metric below a threshold, wherein the content comprises popular content defined as content that has a number of requests above a request threshold per an interval, and wherein the origin server has a copy of the content with a zero age;
   sending, by the cache server, a validation request to the source server; and
   updating the freshness of the content based on a response from the source server where the copy of the content stored at the source server has not been modified.

2. The method of claim 1 wherein the origin server comprises an authoritative server and the high level cache server comprises a non-authoritative server.

3. The method of claim 2 wherein the non-authoritative server comprises a reverse proxy server.

4. The method of claim 1 wherein the source server is selected based on a likelihood of a cache miss at the source server.

5. The method of claim 1 wherein the freshness of the copy of the content is measured by a time-to-live value.

6. The method of claim 5 wherein the content is validated using a hyper text transfer protocol.

7. A memory unit storing program instructions which, when executed by a cache server, cause the cache server to perform operations of processing a request for in the cache server, the operations comprising:
   receiving the request for the content from a client;
   determining if a stale copy of the content is in the cache server;
   estimating a freshness metric and an estimate of a fetching time for each one of a group of servers;
   selecting a source server from the group of servers, based on a comparison of an expected remaining freshness of a copy of the content stored at each one of the group of servers computed based on the estimating, when the stale copy of the content is in the cache server, wherein the group of servers comprises a high level cache server and an origin server, wherein the high level cache server comprises a reverse proxy for the origin server, wherein the high level cache server performs a pre-term refresh from the origin server in accordance with a scheduled process to check for content that has a respective freshness metric below a threshold, wherein the content comprises popular content defined as content that has a number of requests above a request threshold per an interval, and wherein the origin server has a copy of the content with a zero age;

sending a validation request to the source server; and updating the freshness of the content based on a response from the source server where the copy of the content stored at the source server has not been modified.

8. The memory unit of claim 7 wherein the origin server comprises an authoritative server and the high level cache server comprises a non-authoritative server.

9. The memory unit of claim 8 wherein the non-authoritative server comprises a reverse proxy server.

10. The memory unit of claim 7 wherein the source server is selected based on a likelihood of a cache miss at the source server.

11. The memory unit of claim 7 wherein the freshness of the copy of the content is measured by a time-to-live value.

12. The memory unit of claim 11 wherein the content is validated using a hyper text transfer protocol.

\* \* \* \* \*